US012002232B2

(12) United States Patent
Ezra et al.

(10) Patent No.: US 12,002,232 B2
(45) Date of Patent: *Jun. 4, 2024

(54) SYSTEMS AND METHODS FOR SIMULTANEOUS LOCALIZATION AND MAPPING

(71) Applicant: Snap Inc., Santa Monica, CA (US)

(72) Inventors: David Ben Ezra, Beit Shearim (IL); Eyal Zak, Megiddo (IL); Ozi Egri, Yassur (IL)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,940

(22) Filed: May 12, 2023

(65) Prior Publication Data
US 2023/0281851 A1    Sep. 7, 2023

Related U.S. Application Data

(63) Continuation of application No. 17/249,789, filed on Mar. 12, 2021, now Pat. No. 11,816,853, which is a
(Continued)

(51) Int. Cl.
*G06T 7/579* (2017.01)
*G06T 7/20* (2017.01)
(Continued)

(52) U.S. Cl.
CPC .............. *G06T 7/579* (2017.01); *G06T 7/20* (2013.01); *G06T 7/246* (2017.01); *G06T 7/70* (2017.01);
(Continued)

(58) Field of Classification Search
CPC ............ G06T 7/579; G06T 7/20; G06T 7/246; G06T 7/70; G06T 7/73; G06T 2207/10016; G06T 2207/30241; G06T 2207/30244

See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| CN | 109804411 A | 5/2019 |

(Continued)

OTHER PUBLICATIONS

Tanskanen et al ("Live Metric 3D Reconstruction on Mobile Phones", IEEE International Conference on Computer Vision 2013, pp. 65-72), (Year: 2013).*

(Continued)

*Primary Examiner* — Amara Abdi

(74) *Attorney, Agent, or Firm* — SCHWEGMAN LUNDBERG & WOESSNER, P.A.

(57) ABSTRACT

Various embodiments provide systems, methods, devices, and instructions for performing simultaneous localization and mapping (SLAM) that involve initializing a SLAM process using images from as few as two different poses of a camera within a physical environment. Some embodiments may achieve this by disregarding errors in matching corresponding features depicted in image frames captured by an image sensor of a mobile computing device, and by updating the SLAM process in a way that causes the minimization process to converge to global minima rather than fall into a local minimum.

20 Claims, 9 Drawing Sheets

Related U.S. Application Data continuation of application No. 16/532,131, filed on Aug. 5, 2019, now Pat. No. 10,984,547, which is a continuation of application No. 15/691,439, filed on Aug. 30, 2017, now Pat. No. 10,410,367.

(60) Provisional application No. 62/381,036, filed on Aug. 30, 2016.

(51) Int. Cl.
*G06T 7/246* (2017.01)
*G06T 7/70* (2017.01)
*G06T 7/73* (2017.01)

(52) U.S. Cl.
CPC ...... *G06T 7/73* (2017.01); *G06T 2207/10016* (2013.01); *G06T 2207/30241* (2013.01); *G06T 2207/30244* (2013.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B2 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |

(56) References Cited

U.S. PATENT DOCUMENTS

| | | |
|---|---|---|
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,410,367 B2 | 9/2019 | Ezra et al. |
| 10,984,547 B2 | 4/2021 | Ezra et al. |
| 11,816,853 B2 | 11/2023 | Ezra et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |

(56) References Cited

U.S. PATENT DOCUMENTS

| | | |
|---|---|---|
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Alancette et al. |
| 2012/0166971 A1 | 6/2012 | Sachson et al. |

(56) References Cited

U.S. PATENT DOCUMENTS

| | | |
|---|---|---|
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0287271 A1* | 11/2012 | Holland ............... H04N 7/188 348/143 |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'Keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0024721 A1* | 1/2015 | Basu ............... H04M 1/72454 455/414.1 |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0167226 A1* | 6/2016 | Schnittman ........... G06F 18/217 901/1 |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |

(56) References Cited

U.S. PATENT DOCUMENTS

| | | | |
|---|---|---|---|
| 2016/0277419 | A1 | 9/2016 | Allen et al. |
| 2016/0321708 | A1 | 11/2016 | Sehn |
| 2017/0006094 | A1 | 1/2017 | Abou Mahmoud et al. |
| 2017/0061308 | A1 | 3/2017 | Chen et al. |
| 2017/0287006 | A1 | 10/2017 | Azmoodeh et al. |
| 2018/0061072 | A1 | 3/2018 | Benezra et al. |
| 2020/0175705 | A1 | 6/2020 | Ezra et al. |
| 2021/0201520 | A1 | 7/2021 | Ezra et al. |

FOREIGN PATENT DOCUMENTS

| | | |
|---|---|---|
| CN | 109804411 B | 2/2023 |
| CN | 116051640 A | 5/2023 |
| EP | 2051480 A1 | 4/2009 |
| EP | 2151797 A1 | 2/2010 |
| EP | 3507772 B1 | 12/2020 |
| EP | 3800618 B1 | 12/2022 |
| GB | 2399928 A | 9/2004 |
| KR | 19990073076 A | 10/1999 |
| KR | 20010078417 A | 8/2001 |
| KR | 102267482 B1 | 6/2021 |
| KR | 102420857 B1 | 7/2022 |
| KR | 2606785 B1 | 11/2023 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2018045076 A1 | 3/2018 |

OTHER PUBLICATIONS

Klein et al ("Parallel Tracking and Mapping for small AR Workspace", Active Vision Laboratory, Department of Engineering Science University of Oxford, IEEE 2007 (Year: 2007).*
"Whole New Story", Snap, Inc., [Online] Retrieved from the Internet: <URL: https://www.snap.com/en-US/news/>, (2017), 13 pgs.
"Adding photos to your listing", eBay, [Online] Retrieved from the Internet: <URL: http://pages.ebay.com/help/sell/pictures.html>, (accessed May 24, 2017), 4 pgs.
"U.S. Appl. No. 15/691,439, Non Final Office Action dated Oct. 25, 2018", 21 pgs.
"U.S. Appl. No. 15/691,439, Notice of Allowability dated Jun. 19, 2019", 11 pgs.
"U.S. Appl. No. 15/691,439, Notice of Allowance dated Apr. 29, 2019", 15 pgs.
"U.S. Appl. No. 16/532,131, Corrected Notice of Allowability dated Mar. 23, 2021", 7 pgs.
"U.S. Appl. No. 16/532,131, Non Final Office Action dated Sep. 2, 2020", 16 pgs.
"U.S. Appl. No. 16/532,131, Notice of Allowance dated Dec. 16, 2020", 11 pgs.
"U.S. Appl. No. 16/532,131, Preliminary Amendment filed Feb. 19, 2020".
"U.S. Appl. No. 16/532,131, Response filed Nov. 23, 2020 to Non Final Office Action dated Sep. 2, 2020", 11 pgs.
"U.S. Appl. No. 17/249,789, 312 Amendment filed May 9, 2023", 9 pgs.
"U.S. Appl. No. 17/249,789, Non Final Office Action dated Nov. 8, 2022", 28 pgs.
"U.S. Appl. No. 17/249,789, Notice of Allowance dated Mar. 22, 2023", 12 pgs.
"U.S. Appl. No. 17/249,789, Notice of Allowance dated Jul. 6, 2023", 11 pgs.
"U.S. Appl. No. 17/249,789, PTO Response to Rule 312 Communication dated May 22, 2023", 2 pgs.
"U.S. Appl. No. 17/249,789, Response filed Feb. 8, 2023 to Non Final Office Action dated Nov. 8, 2022", 11 pgs.
"U.S. Appl. No. 15/691,439, Response filed Jan. 25, 2019 to Non Final Office Action dated Oct. 25, 2018", 20 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic> (2016), 7 pgs.
"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.
"European Application Serial No. 17768296.0, Communication Pursuant to Article 94(3) EPC dated Jan. 27, 2020", 5 pgs.
"European Application Serial No. 17768296.0, Response filed Jun. 5, 2020 to Communication Pursuant to Article 94(3) EPC dated Jan. 27, 2020", 25 pgs.
"European Application Serial No. 17768296.0, Response filed Aug. 22, 2019 to Communication pursuant to Rules 161(1) and 162 EPC dated Apr. 5, 2019", 43 pgs.
"European Application Serial No. 20210578.9, Extended European Search Report dated Mar. 3, 2021", 9 pgs.
"European Application Serial No. 20210578.9, Response filed Aug. 6, 2021 to Extended European Search Report dated Mar. 3, 2021", 19 pgs.
"European Application Serial No. 22207621.8, Extended European Search Report dated Mar. 28, 2023", 11 pgs.
"InstaPlace Photo App Tell The Whole Story", [Online] Retrieved from the Internet: < URL: youtu.be/uF_gFkg1hBM>, (Nov. 8, 2013), 113 pgs., 1:02 min.
"International Application Serial No. PCT/US2015/037251, International Search Report dated Sep. 29, 2015", 2 pgs.
"International Application Serial No. PCT/US2017/049449, International Preliminary Report on Patentability dated Mar. 14, 2019", 13 pgs.
"International Application Serial No. PCT/US2017/049449, International Search Report dated Nov. 24, 2017", 3 pgs.
"International Application Serial No. PCT/US2017/049449, Written Opinion dated Nov. 24, 2017", 11 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Korean Application Serial No. 10-2019-7009181, Notice of Preliminary Rejection dated Sep. 22, 2020", w/ English translation, 4 pgs.
"Korean Application Serial No. 10-2019-7009181, Response filed Nov. 20, 2020 to Notice of Preliminary Rejection dated Sep. 22, 2020", w/ English Claims, 18 pgs.
"Korean Application Serial No. 10-2021-7018426, Notice of Preliminary Rejection dated Oct. 14, 2021", w/ English translation, 5 pgs.
"Korean Application Serial No. 10-2021-7018426, Response filed Dec. 14, 2021 to Office Action dated Oct. 14, 2021", w/ English Claims, 16 pgs.

(56) References Cited

OTHER PUBLICATIONS

"Korean Application Serial No. 10-2022-7023663, Notice of Preliminary Rejection dated Mar. 16, 2023", w/ English Translation, 4 pgs.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RGOw>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Duy-Nguyen, Ta, et al., "Monocular Parallel Tracking and Mapping with Odometry Fusion for MAV Navigation in Feature-lacking Environments", Georgia Institute of Technology, [Online] Retrieved from the Internet: <URL: https://smartech.gatech.edu/handle/1853/51585?>, (Jan. 1, 2013), 6 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Klein, et al., "Active Vision Laboratory", IEEE, Department of Engineering Science University of Oxford, (2007).

Klein, G, et al., "Parallel Tracking and Mapping for Small AR Workspaces", Proceedings of the 6th IEEE and ACM International Symposium on Mixed and Augmented Reality, IEEE Computer Society, (Nov. 13, 2007), 225-234.

Klein, Georg, "Parallel Tracking and Mapping for Small AR Workspaces—Source Code", PTAM Blog, [Online] Retrieved from the Internet on Apr. 3, 2019: <URL: www.robots.ox.ac.uk/~gk/PTAM/>, (Feb. 2014), 2 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term =.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tanskanen, et al., "Live Metric 3D Reconstruction on Mobile Phone", IEEE International Conference on Computer Vision, (Dec. 1, 2013), 8 pgs.

Tanskanen, et al., "Live Metric 3D Reconstruction on Mobile Phones", IEEE International Conference on Computer Vision, (2013), 65-72.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

\* cited by examiner

SYSTEMS AND METHODS FOR SIMULTANEOUS LOCALIZATION AND MAPPING

CROSS-REFERENCE TO RELATED APPLICATION

This application is a continuation of U.S. patent application Ser. No. 17/249,789, filed Mar. 12, 2021, which application is a continuation of and claims priority to U.S. patent application Ser. No. 16/532,131, filed on Aug. 5, 2019, which is a continuation of and claims priority to U.S. patent application Ser. No. 15/691,439, filed on Aug. 30, 2017, which claims priority to and the benefit of U.S. Provisional Application Ser. No. 62/381,036, filed on Aug. 30, 2016, each of which are incorporated herein by reference in their entireties.

TECHNICAL FIELD

Embodiments described herein relate to localization and mapping of a sensor within a physical environment and, more particularly, to systems, methods, devices, and instructions for performing simultaneous localization and mapping (SLAM).

BACKGROUND

A SLAM (Simultaneous Localization and Mapping) process (e.g., algorithm) can be used by a mobile computing device (e.g., mobile phone, tablet, wearable augmented reality (AR) device, wearable, autonomous aerial or ground vehicle, or a robot) to map the structure of a physical environment surrounding the mobile computing device and to localize the mobile computing device's relative position within that mapped environment. A SLA M process can usually map and localize, in real-time, as the mobile computing device moves about within its physical environment.

Although not exclusively image-based, some SLAM processes achieve mapping and localization by using images of the physical environment provided by an image sensor associated with the mobile computing device, such as a mobile phone's built-in camera. From the captured images, such SLAM processes can recover the mobile computing device position and construct a map of the physical environment surrounding the mobile computing device, by recovering both the image sensor's pose and the structure of the map without initially knowing either.

SLAM processes that use captured images usually require several images of corresponding physical features (hereafter, features), in the physical environment, that are captured by an image sensor (e.g., of a mobile computing device) at different poses. The images captured from the different camera locations permit such SLAM processes to converge and start their localization and mapping processes. Unfortunately, the localization problem in an image-based SLAM process is usually difficult to solve due to errors in matching corresponding features between captured images—these errors tend to move the local result of the minimization problem of the SLAM process to a local minimum rather than a global minima, which provides a specific location.

BRIEF DESCRIPTION OF THE DRAWINGS

Various ones of the appended drawings merely illustrate some embodiments of the present disclosure and should not be considered as limiting its scope. The drawings are not necessarily drawn to scale. To easily identify the discussion of any particular element or act, the most significant digit or digits in a reference number refer to the figure number in which that element is first introduced, and like numerals may describe similar components in different views.

DETAILED DESCRIPTION

Figure 1:
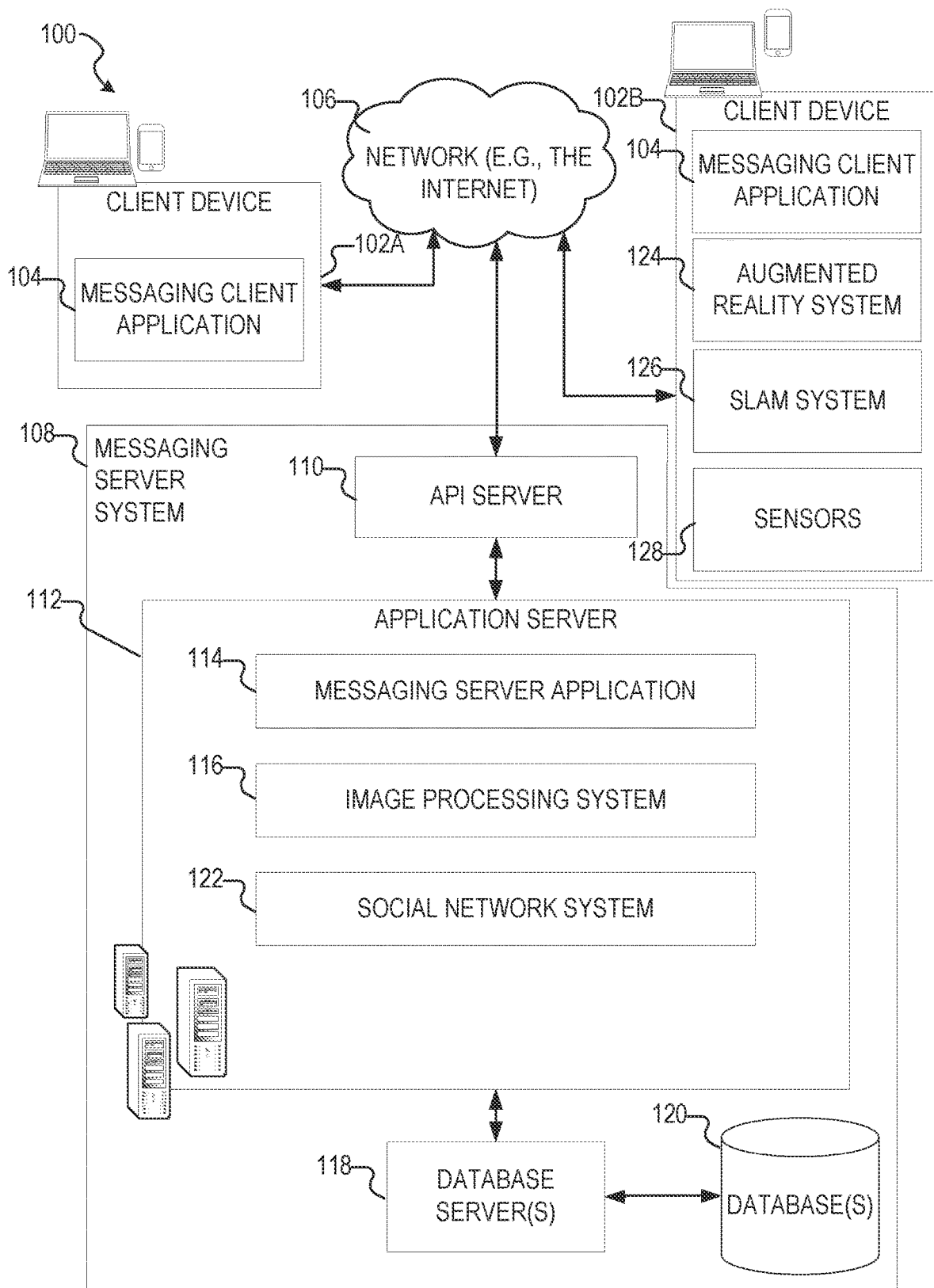
FIG. 1 is a block diagram illustrating an example high-level client-server-based network architecture that includes a simultaneous localization and mapping (SLAM) system, according to some embodiments.

Various embodiments provide systems, methods, devices, and instructions for performing simultaneous localization and mapping (SLAM) that involve initializing a SLAM process using images (hereafter, image frames) from as few as two different poses (e.g., physical locations) of the camera within a physical environment. Some embodiments may achieve this by disregarding errors in matching corresponding features (hereafter, feature errors) depicted in image frames (of a physical environment) captured by an image sensor of a mobile computing device, and by updating the SLAM process in a way that causes the minimization process to converge to global minima rather than fall into a local minimum. The global minima can provide a physical location of the image sensor.

According to some embodiments, a SLAM process initializes by detecting movement of a mobile computing device, within a physical environment, between two physical locations, where the movement is bounded by two image frames (hereafter, images) distinguishable and captured by an image sensor of the mobile computing device. The mobile computing device may identify the two distinguishable images by the mobile computing device correlating image blur, detected via the image sensor, with a shock or impulse of movement detected via a movement sensor of the mobile computing device (e.g., an inertial measurement unit (IMU) or an accelerometer). The movement detected by the mobile computing device may comprise the shock or impulse detected when the mobile computing device initially starts movement, and may also comprise the shock or impulse detected when the mobile computing device finally stops movement. In this way, various embodiments can tie data from one or more sensors of the mobile computing device to specific images captured by the image sensor of the mobile computing device, which in turn can initialize operation of the SLAM process. Additionally, various embodiments can permit a SLAM process of an embodiment to initialize each key image frame based on a previous image frame and use an IMU to determine an initial distance.

For some embodiments, the movement comprises a side-step performed by a human individual holding the mobile computing device, which can provide a sufficient parallax for good SLAM initialization. In particular, an embodiment may analyze the movement of the human individual and extract relevant portions of the movement using the impulse created at the start and finish of the sidestep (e.g., based on a typical human sidestep). Subsequently, the embodiment may use those relevant portions to identify first and second key image frames and initialize the SLAM process based on the first and second key image frames.

Some embodiments enable a SLAM process to determine localization of a mobile computing device and map the physical environment of the mobile computing device (e.g., with a usable or acceptable level of accuracy), while using a movement sensor that provides poor accuracy (e.g., a noisy IMU). Some embodiments enable the SLAM process to determine localization and map the physical environment while using a limited amount of image data. Some embodiments enable the SLAM process to determine localization and map the physical environment in real-time, while using a limited computing resources (e.g., low power processor). Additionally, some embodiments enable the SLAM process to determine localization and map the physical environment without using depth data.

A SLAM technique of some embodiments may be used to: track key points (tracking points) in two-dimensional (2D) image frames (e.g., of a video stream); and identify three-dimensional (3D) features (e.g., physical objects in a physical environment) in the 2D image frames as well as a relative physical pose (e.g., location) of the camera to 3D features.

For instance, a SLAM technique of an embodiment may be used with augmented reality (AR) image processing and image frame tracking. In particular, an image frame captured for an AR system may be tracked using the SLAM technique and then a virtual object may be placed within, or relative to, the captured image frame as part of an AR display of a device, such as smart glasses, smart phone, tablet, or another mobile computing device. As used herein, augmented reality (AR) refers to systems, methods, devices, and instructions that can capture image frames, enhance those image frames with additional information, and then present the enhanced information on a display. This may, for example, enable a user to hold up a mobile computing device (e.g., smart phone or tablet) to capture a video stream of a scene, and an output display of the mobile computing device to present the scene as visible to the user along with additional information. This additional information may include placing virtual objects in the scene so that the virtual objects are presented as if they exist in the scene. Aspects of such virtual objects are processed to occlude the virtual object if another real or virtual object passes in front of the virtual object as shown from the perspective of the image sensor capturing the physical environment. Such virtual objects are also processed to maintain their relationship with real objects as both real and virtual objects move over time, and as the perspective of the image sensor capturing the environment changes.

Some embodiments provide for a method comprising performing cycles of a full SLAM process, performing cycles of a partial SLAM process, and performing the partial SLAM process cycles and the full SLAM process cycles such that the partial SLAM process cycles are performed more frequently than the full SLAM process cycles. According to various embodiments, a full SLAM process cycle performs a full SLAM process, while a partial SLAM process cycle performs a partial SLAM process that requires less of a computing resource (e.g., processing, memory resources, or both) to perform than does performing the full SLAM process. Additionally, a partial SLAM process may perform faster than a full SLAM process cycle.

For some embodiments, the partial SLAM process only performs a localization portion of a SLAM process. In alternative embodiments, the partial SLAM process only performs a mapping portion of a SLAM process. By performing only a portion of a SLAM process, a partial SLAM process may perform using less computing resources than a full SLAM process, and may perform faster than a full SLAM process. Further, by performing the full SLAM process cycles less frequently than the partial SLAM process cycles, various embodiments achieve SLAM results (e.g., useful and accurate SLAM results) while limiting the computer resources needed to achieve those results. Accordingly, various embodiments are suitable for performance of a SLAM process on a device that otherwise has limited computing resources for performing traditional SLAM techniques, such as a smart phone or smart glasses having limited processing power.

For some embodiments, image frames are captured (e.g., continuously captured at a particular sample rate) by an image sensor of a device, such as a camera of a mobile phone. Some embodiments perform the full SLAM process cycles on those captured image frames identified (e.g., generated) as new key image frames, while performing the partial SLAM process cycles on those captured image frames not identified as key image frames. In some embodiments, a captured image frame is identified (e.g., generated) as a new key image frame when one or more key image frame conditions are satisfied. Various embodiments use the key image frame conditions to ensure that new key image frames identified from the captured image frames are sufficiently unique to ensure that each full SLAM process cycle is performed as intended or as expected.

For instance, a new key image frame may be generated when the captured image frame is at least of, if not better than, a predetermined quality (e.g., fair image equality). In this way, an embodiment may avoid designating, as new image frames, those image frames captured during movement of the image sensor, which likely captured image blur caused by the movement of the image sensor. The image quality of a captured image frame may be determined by a gradient histogram method, which can determine the quality of a current image frame based on the quality of a predetermined number of prior captured image frames. In another instance, a new key image frame may be generated only after a certain amount of time or certain number of cycles (e.g., partial SLAM process cycles) has passed between identification (e.g., generation) of the last new key image frame. In this way, an embodiment can avoid every captured image frame from being treated as a key image frame and processed by a full SLAM cycle, which, as described herein, can be processor-intensive or memory-intensive to perform and not suitable for continuous performance on a device having limited computing resources. In another instance, a new key image frame may be generated only after a certain amount of translation (e.g., caused by image sensor position change in the physical environment with respect to X, Y, or Z coordinates) is detected between the current captured image frame and a previous image frame. In this way, an embodiment can avoid too many image frames, capturing the same point in the physical environment, being designated as new key image frames, which would not be helpful for three-dimensional (3)) mapping purposes.

For some embodiments, the full SLAM process cycles and the partial SLAM process cycles may be performed in parallel, whereby the full SLAM process cycles are only performed on those captured image frames identified as new key image frames and the partial SLAM process cycles are performed on all other image frames captured between non-key image frames. Additionally, for some embodiments, the full SLAM process cycles and the partial SLAM process cycles begin to perform after SLAM initialization is performed as described herein. For instance, a SLAM initialization process of an embodiment may produce the first two key image frames (e.g., based on a sidestep by a human individual), provide initial localization data (e.g., comprising the six degrees of freedom (6DOF) for the second key image frame), and provide initial mapping data (e.g., comprising 3D positions of features matched between the first two key image frames). Subsequently, the full SLAM process cycles and the partial SLAM process cycles can begin to perform based on the initial localization and mapping data provided by the SLAM initialization process.

Although various embodiments are described herein with respect to use of an IMU, it will be understood that some embodiments may utilize one or more other sensors in addition to, or in place of, the IMU, such as an accelerometer or a gyroscope. As used herein, degrees of freedom (DOF) (e.g., as measured by an IMU, accelerometer, or gyroscope) may comprise displacement (e.g., measured according to X, Y, and Z coordinates) and orientation (e.g., measured according psi, theta, and phi). Accordingly, six degrees of freedom (6DOF) parameters may comprise values representing distance along an x-axis, y-axis, and z-axis, and values representing rotations according to Euler angles psi, theta, and phi. Four degrees of freedom (4DOF) parameters may comprise values representing distance along an x-axis, y-axis, and z-axis, and a value representing rotation according to a Euler angle (e.g., phi).

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example high-level client-server-based network architecture 100 that includes a simultaneous localization and mapping (SLAM) system 126, according to some embodiments. As shown, the network architecture 100 includes a client device 102A and a client device 102B (hereafter, collectively referred to as client devices 102), the SLAM system 126 included in the client device 102B; a messaging server system 108; and a network 106 (e.g., the Internet or wide area network (WAN)) that facilitates data communication between the client devices 102 and the messaging server system 108. In the network architecture 100, the messaging server system 108 can provide server-side functionality via the network 106 to the client devices 102. In some embodiments, a user (now shown) interacts with one of the client devices 102 or the messaging server system 108 using one of the client devices 102.

The client devices 102 may comprise a computing device that includes at least a display and communication capabilities that provide communications with the messaging server system 108 via the network 106. Each of the client devices 102 may comprise, without limitation, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game console, set-top box, network personal computer (PC), mini-computer, and so forth. Depending on the embodiment, at least one of the client devices 102 may comprise one or more of a touch screen, inertial measurement unit (IMU), accelerometer, gyroscope, biometric sensor, camera, microphone, Global Positioning System (GPS) device, and the like.

For some embodiments, the client device 102B represents a mobile computing device, such as a mobile phone, tablet, or wearable device (e.g., smart glasses, a smart visor, or a smart watch), that includes an image sensor. As shown, the client device 102B includes sensors 128, which can include the image sensor (e.g., camera) of the client device 102B and other sensors, such as an inertial measurement unit (IMU), accelerometer, or gyroscope. For various embodiments, the sensors 128 facilitate operation of the SLAM system 126 on the client device 102B.

The SLAM system 126 performs a SLAM technique of an embodiment on the client device 102B, which can permit the client device 102B to map its physical environment while simultaneously determining its location within that physical environment. Additionally, for some embodiments, the SLAM system 126 permits the performance of a SLAM technique on the client device 102B despite the client device 102B having limited computing resources (e.g., processing or memory resources), which may prevent traditional SLAM techniques from operating on the client device 102B as intended. The SLAM technique performed by the SLAM system 126 may support image frame tracking for an augmented reality system 124 of the client device 102B.

As shown, the client device 102B includes an augmented reality system 124, which may represent an augmented reality application operating on the client device 102B. The augmented reality system 124 may provide functionality to generate augmented reality images for display on a display (e.g., AR display) of the client device 102B. The network architecture 100 may be used to communicate information for virtual objects to be displayed on client device 102B by the augmented reality system 124 included by client device 102B, or provide data (e.g., street view data) used to create models used by the augmented reality system 124. An image frame captured for the augmented reality system 124 may be tracked using the SLAM system 126 and then a virtual object may be placed within, or relative to, the captured image frame as part of an AR display of the client device 102B.

Each of the client devices 102 can host a number of applications, including a messaging client application 104, such as an ephemeral message application. Each messaging client application 104 may be communicatively coupled to other instances of the messaging client application 104 and a messaging server system 108 via a network 106 (e.g., the Internet). Accordingly, each messaging client application 104 may be able to communicate and exchange data with another messaging client application 104 and with the messaging server system 108 via the network 106. The data exchanged between messaging client applications 104, and between a messaging client application 104 and the messaging server system 108, may include functions (e.g., commands to invoke functions) as well as payload data (e.g., text, audio, video or other multimedia data).

The messaging server system 108 provides server-side functionality via the network 106 to a particular messaging client application 104. While certain functions of the network architecture 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104 or the augmented reality system 124. Such operations include transmitting data to, receiving data from, and processing data generated by the messaging client application 104 or the augmented reality system 124. This data may include message content, client device information, geolocation information, media annotation and overlays, message content persistence conditions, social network information, augmented reality (AR) content, and live event information, as examples. Data exchanges within the network architecture 100 are invoked and controlled through functions available via user interfaces (UIs) of the messaging client application 104 or the augmented reality system 124.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages or augmented reality-related data processed by the application server 112.

Dealing specifically with the Application Program Interface (API) server 110, this server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104, the setting of a collection of media data (e.g., story); the retrieval of a list of friends of a user of a client device 102; the retrieval of such collections; the retrieval of messages and content; the adding and deletion of friends to a social graph; the location of friends within a social graph; opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. The text and media content from multiple sources may be aggregated into collections of content (e.g., called stories or galleries). These collections are then made available, by the messaging server application 114, to the messaging client application 104. Other processor—and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph within the database 120. Examples of functions and services supported by the social network system 122 include the identification of other users of the messaging system 108 with which a particular user has relationships or is "following", and also the identification of other entities and interests of a particular user.

The application server 112 is communicatively coupled to a database server 118, which facilitates access to a database 120 in which is stored data associated with messages or augmented reality content processed by the application server 112.

Figure 2:
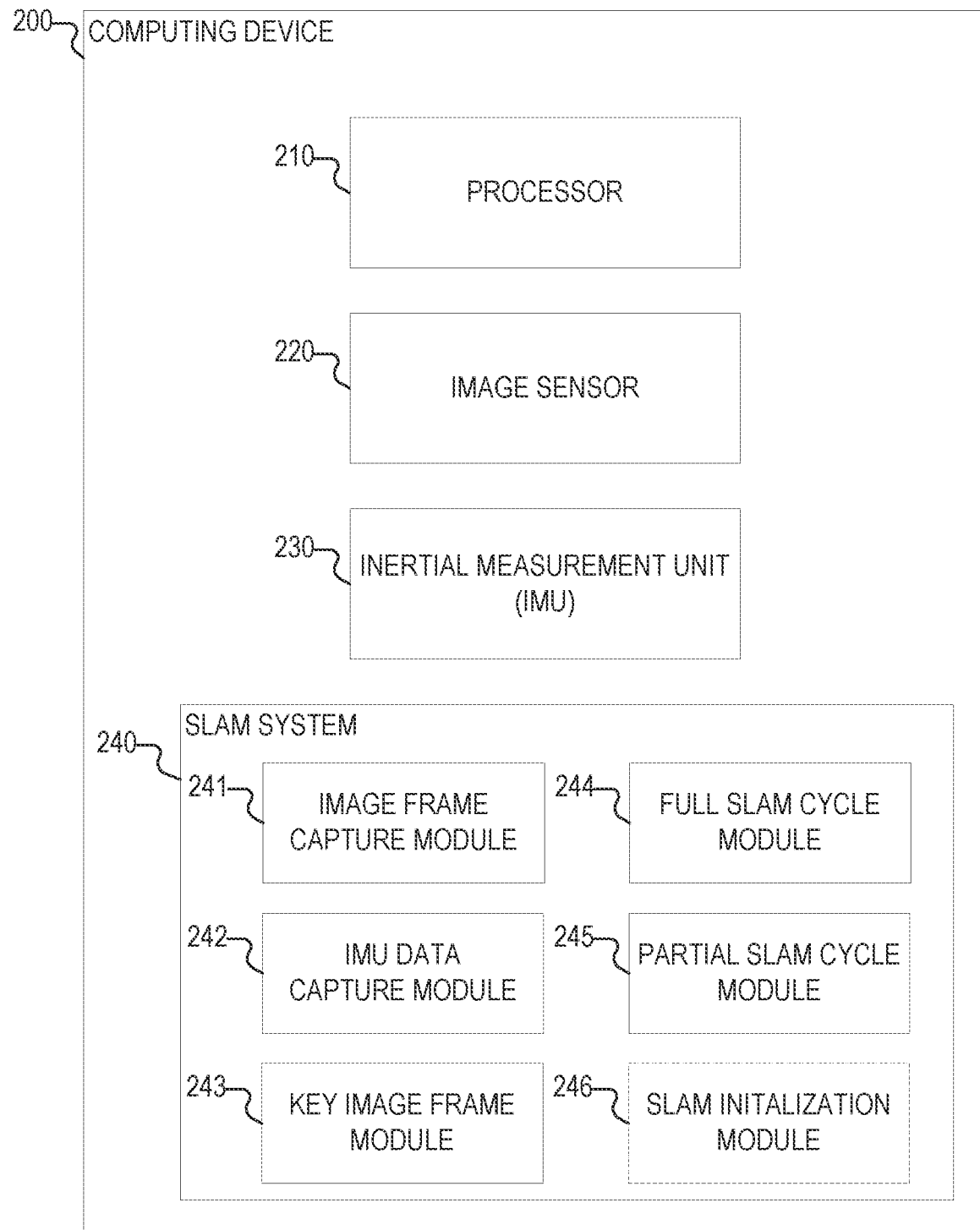
FIG. 2 is a block diagram illustrating an example computing device including a SLAM system, according to some embodiments.

FIG. 2 is a block diagram illustrating an example computing device 200 including a SLAM system 240, according to some embodiments. The computing device 200 may represent a mobile computing device, such as a mobile phone, tablet, laptop, wearable device, or the like, which a human individual can readily move around in a physical environment. As shown, the computing device 200 includes a processor 210, an image sensor 220, an inertial measurement unit (IMU) 230, and the SLA M system 240. The SLAM system 240 includes an image frame capture module 241, an IMU data capture module 242, a key image frame module 243, a full SLAM cycle module 244, and a partial SLAM cycle module 245. Depending on the embodiment, the SLAM system 240 may or may not include a SLAM initialization module 246.

Any one or more of the functional components (e.g., modules) of the SLAM system 240 may be implemented using hardware (e.g., the processor 210 of the computing device 200) or a combination of hardware and software. For instance, any one of the components described herein may configure the processor 210 to perform the operations described herein for that component. Moreover, any two or more of these components may be combined into a single component, and the functions described herein for a single component may be subdivided among multiple components. Furthermore, according to various example embodiments, any of the functional components illustrated FIG. 2 may be implemented together or separately within a single machine, database, or device or may be distributed across multiple machines, databases, or devices.

The processor 210 may comprise a central processing unit (CPU), the image sensor 220 may comprise a camera built-into the computing device 200 or one that is externally coupled to the computing device 200, and the IMU 230 may comprise a sensor capable of measuring degrees of freedom (e.g., 6DOF) with respect to at least the image sensor 220, if not the computing device 200 as well. Though not shown, the computing device 200 may include other sensors to facilitate the operation of the SLAM system 240, such as an accelerometer or a gyroscope.

The image frame capture module 241 may invoke, cause, or perform continuous capture of new image frames of a physical environment of the computing device 200 by the image sensor 220. The continuous capture may be performed according to a predetermined sampling rate, such as 25 or 30 frames per a second. The image frame capture module 241 may add new image frames continuously captured by the image sensor 220 to a set of captured image frames, which can be further processed by the SLAM system 240.

The IMU data capture module 242 may invoke, cause, or perform continuous capture of IMU data from the IMU 230 in correspondence to the image frames captured by the image frame capture module 241. For instance, the IMU data capture module 242 may capture IMU data for each image frame captured. For a given captured image frame, the captured IMU data may comprise degrees of freedom (DOF) parameters of the image sensor at the time the image frame was captured by the image sensor. The DOF parameters may comprise, for example, four degrees of freedom (4DOF) or six degrees of freedom (6DOF) measured with respect to the image sensor 220. Where the IMU 230, the image sensor 220, and the computing device 200 are physically integrated as a single unit, the IMU data may reflect DOF parameters of the image sensor 220 and the computing device 200.

For each particular new image frame added to the set of captured image frames (e.g., by the image frame capture module 241), the key image frame module 243 may determine whether a set of key image frame conditions is satisfied for the particular new image frame. The key image frame module 243 may identify the particular new image frame as a new key image frame in response to the set of key image frame conditions being satisfied for the particular new image frame. In this way, the key image frame module 243 can generate new key image frames according to a set of key image frame conditions. As described herein, a set of key image frame conditions can ensure that new key image frames are sufficiently unique for processing by a full SLAM process cycle. An example key image frame condition may relate to whether a new image frame meets or exceeds a certain image quality, whether a minimum time has lapsed since a full SLAM process cycle was last performed, or whether a translation between a prior image frame and the new image frame meets or exceeds a minimum translation threshold.

The full SLAM cycle module 244 may perform a full SLAM process cycle on each particular new key image frame identified by the key image frame module 243. Performing the full SLAM process cycle on the particular new key image frame may comprise determining 6DOF of the image sensor of the computing device in association with the particular new key image frame. Additionally, performing the full SLAM process cycle on the particular new key image frame may comprise determining a set of 3D positions of new 3D features matched in the particular new key image frame. More regarding partial SLAM process cycles is described herein with respect to FIG. 6.

The partial SLAM cycle module 245 may perform a partial SLAM process cycle on each particular new image frame not identified by the key image frame module 243. For some embodiments, the partial SLAM process cycle only performs a localization portion of a SLAM process. Performing the partial SLAM process cycle on the particular new image frame may comprise determining 6DOF of the image sensor 220 of the computing device 200 in association with the particular new image frame. Additionally, performing the partial SLAM process cycle on the particular new image frame may comprise projecting a set of tracking points on the particular new image frame based on the 6DOF of the image sensor 220. Alternatively, for some embodiments, the partial SLAM process cycle only performs a mapping portion of a SLAM process. More regarding partial SLAM process cycles is described herein with respect to FIG. 7.

The SLAM initialization module 246 may detect a movement of the image sensor 220 from a first pose (e.g., orientation or location of the image sensor 220), in the physical environment, to a second pose, in the physical environment, based on the captured IMU data from the IMU data capture module 242. The SLAM initialization module 246 may identify a first key image frame and a second key image frame based on the movement. In particular, the first and second key image frames may be identified such that the first key image frame corresponds to a start impulse of the movement, and the second key image corresponds to a finish impulse of the movement. For instance, where a human individual is holding the computing device 200, the start impulse of the movement may be the beginning of a sidestep performed by the human individual, and the finish impulse of the movement may be the end of the sidestep. The start or finish impulse may be detected using a shock function of the computing device 200.

FIGS. 3-7 are flowcharts illustrating example methods for SLAM processing, according to various embodiments. It will be understood that example methods described herein may be performed by a device, such as a computing device (e.g., the computing device 200), in accordance with some embodiments. Additionally, example methods described herein may be implemented in the form of executable instructions stored on a computer-readable medium or in the form of electronic circuitry. For instance, one or more operations of a method 300 of FIG. 3 may be represented by executable instructions that, when executed by a processor of a computing device, cause the computing device to perform the method 300. Depending on the embodiment, an operation of an example method described herein may be repeated in different ways or involve intervening operations not shown. Although the operations of example methods may be depicted and described in a certain order, the order in which the operations are performed may vary among embodiments, including performing certain operations in parallel.

Figure 3:
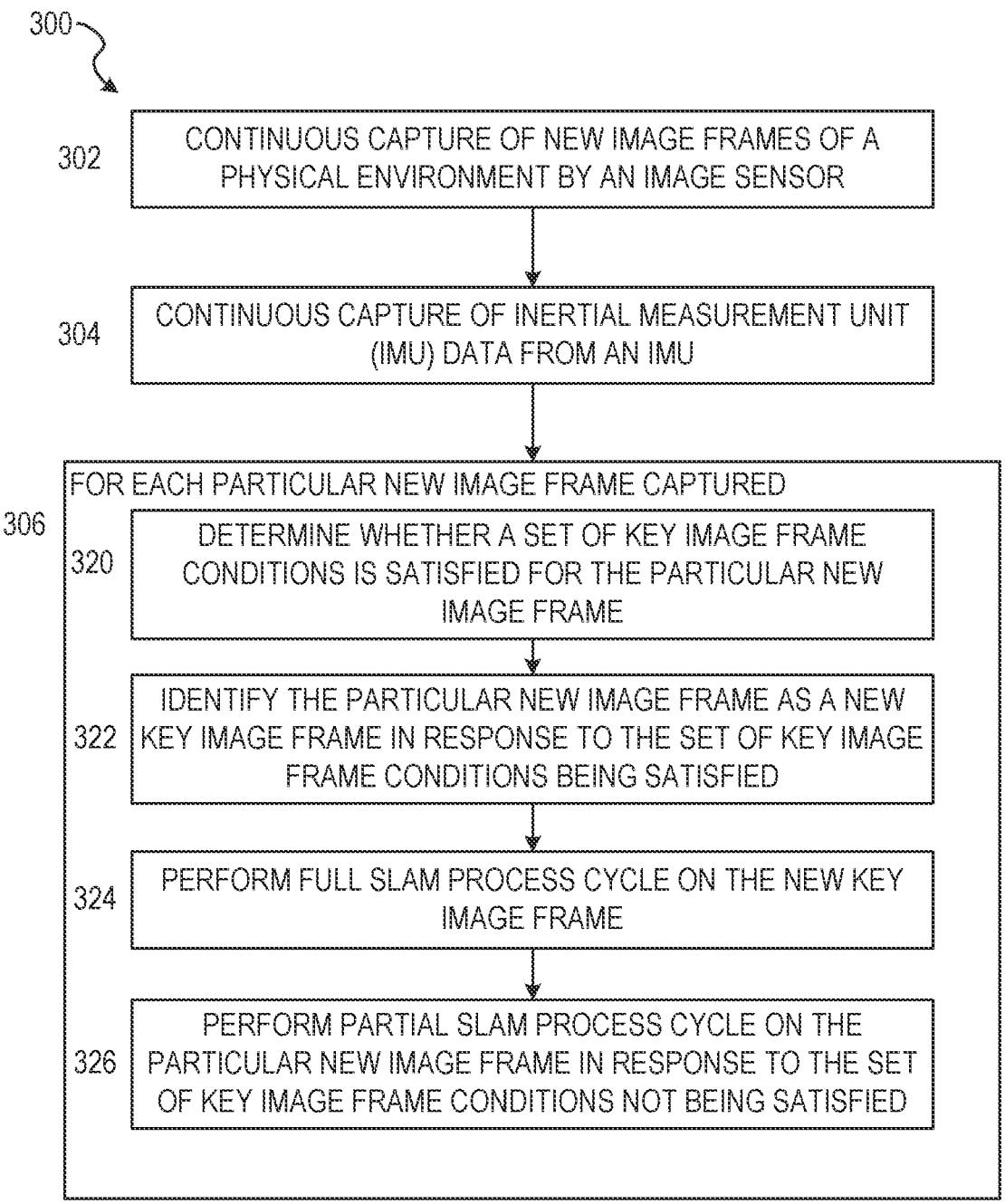
FIGS. 3-7 are flowcharts illustrating example methods for SLAM processing, according to various embodiments.

FIG. 3 is a flowchart illustrating an example method 300 for SLAM processing, according to some embodiments. In particular, the method 300 illustrates how an embodiment may perform full SLAM process cycles and partial SLAM process cycles. As shown, the method 300 begins with operation 302 invoking, causing, or performing continuous capture of new image frames of a physical environment of a computing device, by an image sensor of the computing device. Operation 302 adds the new image frames to a set of captured image frames, which can be further processed by the method 300. The method 300 continues with operation 304 invoking, causing, or performing continuous capture of IMU data, from an inertial measurement unit (IMU) of the computing device, in correspondence to the image frames captured by operation 302. As described herein, the IMU data of a particular image frame may comprise degrees of freedom (DOF) of the image sensor, as measured by the IMLU, at the time the image frame was captured by operation 302.

The method 300 continues with operation 306, which performs operations 320 through 326 for each particular new image frame captured and added to the set of captured image frames by operation 302. Operation 306 begins with operation 320 determining whether a set of key image frame conditions is satisfied for the particular new image frame. Operation 306 continues with operation 322 identifying the particular new image frame as a new key image frame in response to operation 320 determining that the set of key image frame conditions is satisfied for the particular new image frame.

Operation 306 continues with operation 324 performing a full SLAM process cycle on the new key image frame. For future processing purposes, some embodiments keep track of those image frames identified as key image frames. Performing the full SLAM process cycle on the particular new key image frame may comprise determining 6DOF of the image sensor of the computing device in association with the particular new key image frame. Additionally, performing the full SLAM process cycle on the particular new key image frame may comprise determining a set of 3D positions of new 3D features matched in the particular new key image frame. More regarding partial SLAM process cycles is described herein with respect to FIG. 6.

Operation 306 continues with operation 326 performing a partial SLAM process cycle on the particular new image frame in response to operation 320 determining that the set of key image frame conditions is not satisfied for the particular new image frame (i.e., non-key new image frames). Performing the partial SLAM process cycle on the particular new image frame may comprise determining 6DOF of the image sensor of the computing device in association with the particular new image frame. Additionally, performing the partial SLAM process cycle on the particular new image frame may comprise projecting a set of tracking points on the particular new image frame based on the 6DOF of the image sensor. More regarding partial SLAM process cycles is described herein with respect to FIG. 7.

Figure 4:
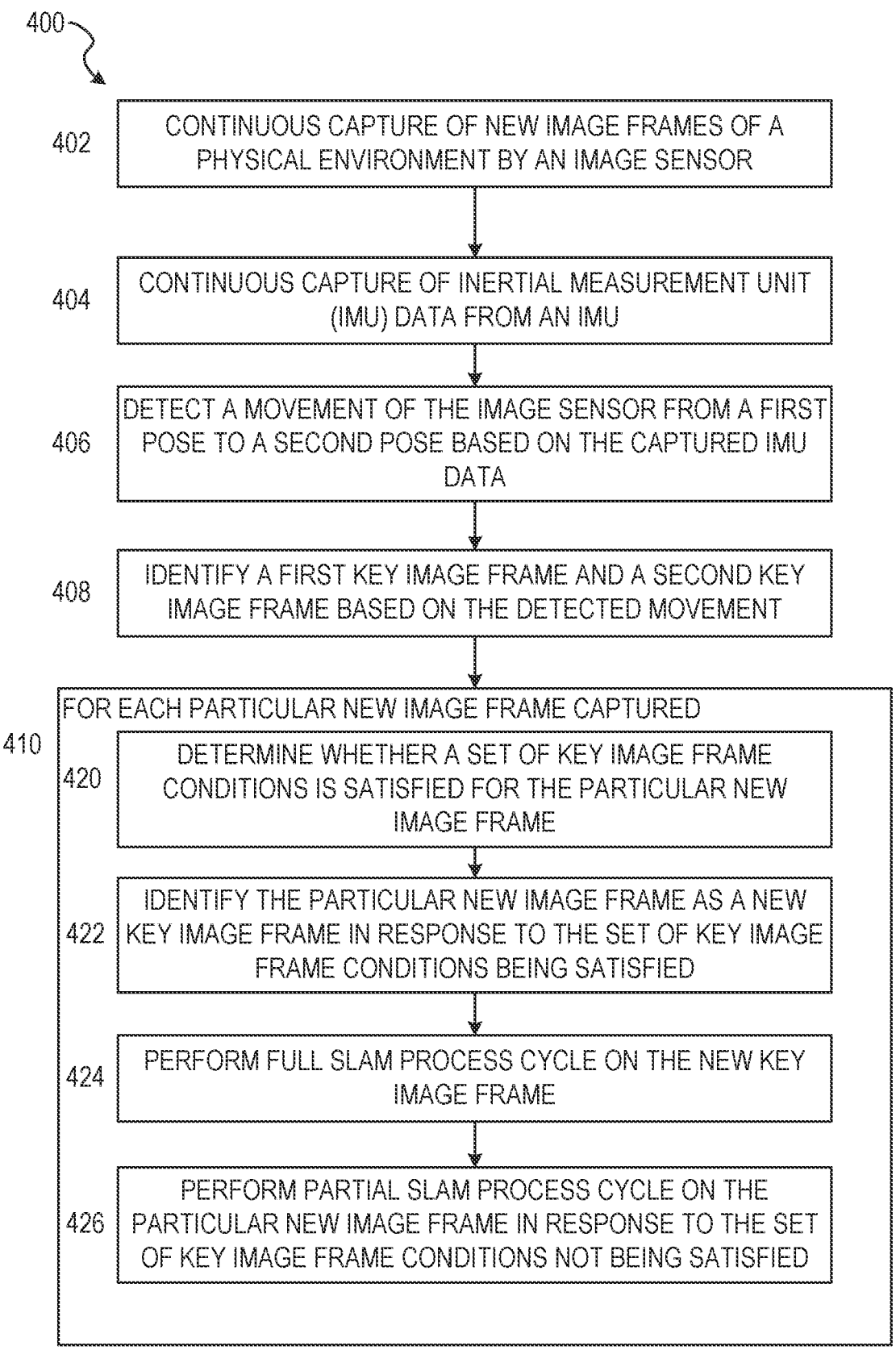

FIG. 4 is a flowchart illustrating an example method 400 for SLAM processing, according to some embodiments. In particular, the method 400 illustrates how an embodiment may initialize a SLAM process, perform full SLAM process cycles, and perform partial SLAM process cycles. As shown, the method 400 begins with operations 402 and 404, which, according to some embodiments, are respectively similar to operations 302 and 304 of the method 300 described above with respect to FIG. 3.

The method 400 continues with operation 406 detecting, based on the captured IMU data, a movement of the image sensor from a first pose (e.g., orientation or location of the image sensor), in the physical environment, to a second pose in the physical environment. The method 400 continues with operation 408 identifying a first key image frame and a second key image frame based on the movement detected by operation 406. For some embodiments, the first key image frame corresponds to a start impulse of the movement, and the second key image frame corresponds to a finish impulse of the movement. By operations 406 and 408, some embodiments can initialize the method 400 for performance of full and partial SLAM process cycles by operation 410. As described herein, the movement may be caused by a human individual performing a sidestep while holding a computing device performing the method 400 and including the image sensor.

The method 400 continues with operation 410, which performs operations 420 through 426 for each particular new image frame captured and added to the set of captured image frames by operation 402. According to some embodiments, operations 420 through 426 are respectively similar to operations 320 through 326 of the method 300 described above with respect to FIG. 3.

Figure 5:
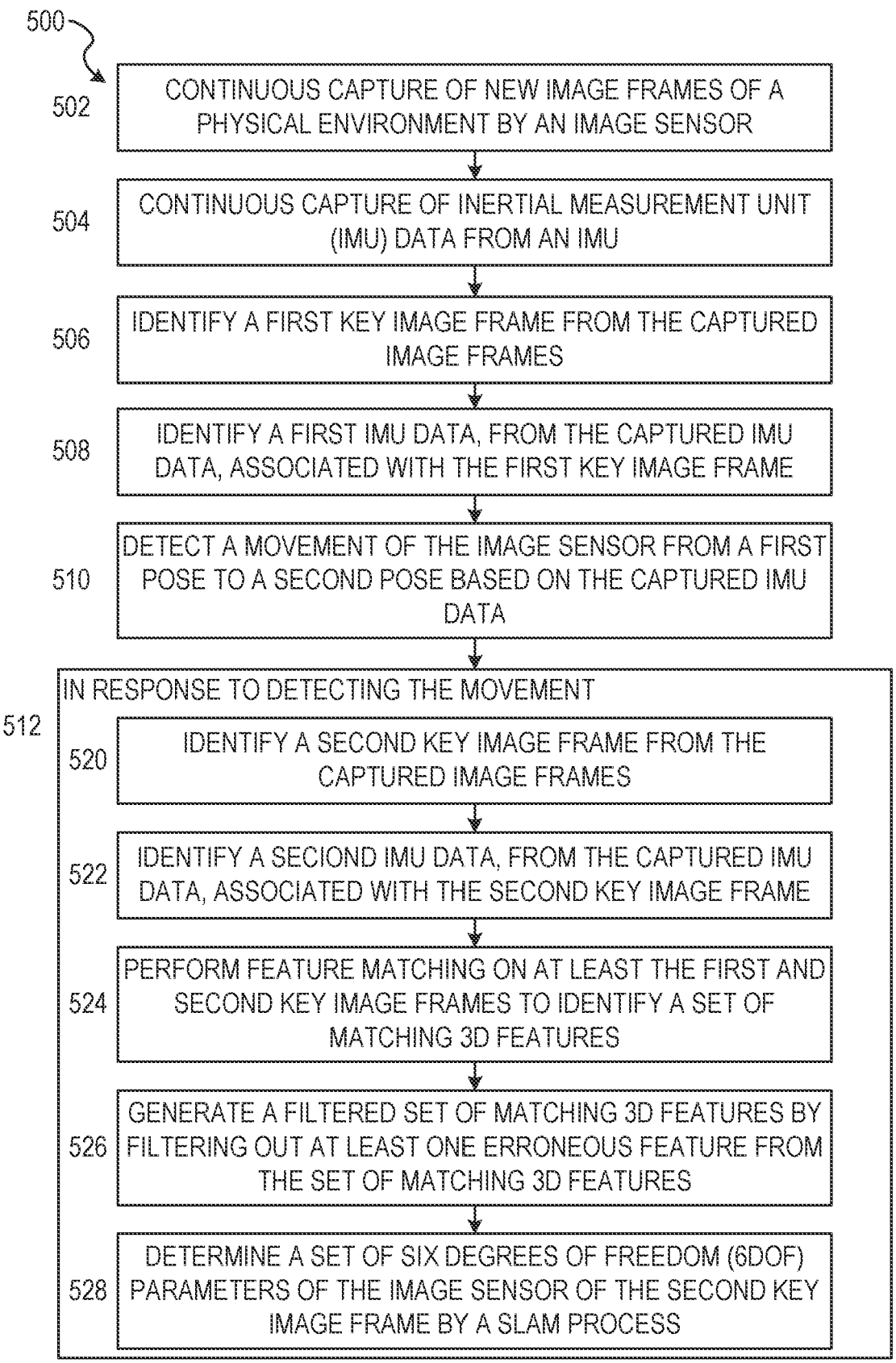

FIG. 5 is a flowchart illustrating an example method 500 for SLAM processing, according to some embodiments. In particular, the method 500 illustrates how an embodiment may initialize a SLAM process. As shown, the method 500 begins with operations 502 and 504, which, according to some embodiments, are respectively similar to operations 302 and 304 of the method 300 described above with respect to FIG. 3.

The method 500 continues with operation 506 identifying a first key image frame from the set of captured image frames. The first key image frame identified may comprise a certain image quality (e.g., fair quality) and may be one captured by the image sensor (e.g., image sensor 220) when the IMU (e.g., IMU 230) indicates that the image sensor is stable. Accordingly, operation 506 may not identify a first key image frame until an image frame is captured while the image sensor is stable and the captured image frame meets a certain image quality.

The method 500 continues with operation 508 identifying first IMU data, from the IMU data captured by operation 504, associated with the first key image frame. For some embodiments, the first IMU data comprises 4DOF parameters (e.g., x, y, z, and phi). The first IMU data may represent IMU data captured at the time the first key image frame was captured by the image sensor.

The method 500 continues with operation 510 detecting, by the IMU, a movement of the image sensor from a first pose (e.g., orientation or location), in the physical environment, to a second pose in the physical environment. As described herein, the movement may be caused by a human individual performing a sidestep while holding a computing device performing the method 500 and including the image sensor and the IMU.

The method 500 continues with operation 512, which performs operations 520 through 528 in response to detecting the movement by operation 510. Operation 512 begins with operation 520 identifying a second key image frame from the set of captured image frames. While the first key image frame may be identified by operation 506 such the first key image frame corresponds to the start of the movement detected by operation 510, the second key image frame may be identified by operation 520 such that the second key image frame corresponds to the end of the movement detected by operation 510.

Operation 512 continues with operation 522 identifying second IMU data, from the IMU data captured by operation 504, associated with the second key image frame. For some embodiments, the second IMU data comprises 4DOF parameters (e.g., x, y, z, and phi). The second IMU data may represent IMU data captured at the time the second key image frame was captured by the image sensor.

Operation 512 continues with operation 524 performing feature matching on at least the first and second key image frames to identify a set of matching 3D features in the physical environment. For some embodiments, operation 524 uses a feature matcher based on KAZE or A-KAZE, which extracts 3D features from a set of image frames by matching features across the image frames. Operation 512 continues with operation 526 generating a filtered set of matching 3D features by filtering out at least one erroneous feature, from the set of matching 3D features produced by operation 524, based on a set of error criteria. For instance, the set of error criteria may include an error criterion relating to an epipolar axis, projected error, or spatial error. If features errors are found, the method 500 may return to operation 524 to perform feature matching again. Operation 512 continues with operation 528 determining a set of 6DOF parameters of the image sensor for the second key image frame and a set of 3D positions for the set of matching 3D features. To facilitate this determination, operation 512 performs a (full) SLAM process on the second key image frame based on the first IMU data identified by operation 506, the second IMU data identified by operation 522, and the filtered set of matching 3D features extracted by operation 526.

Figure 6:
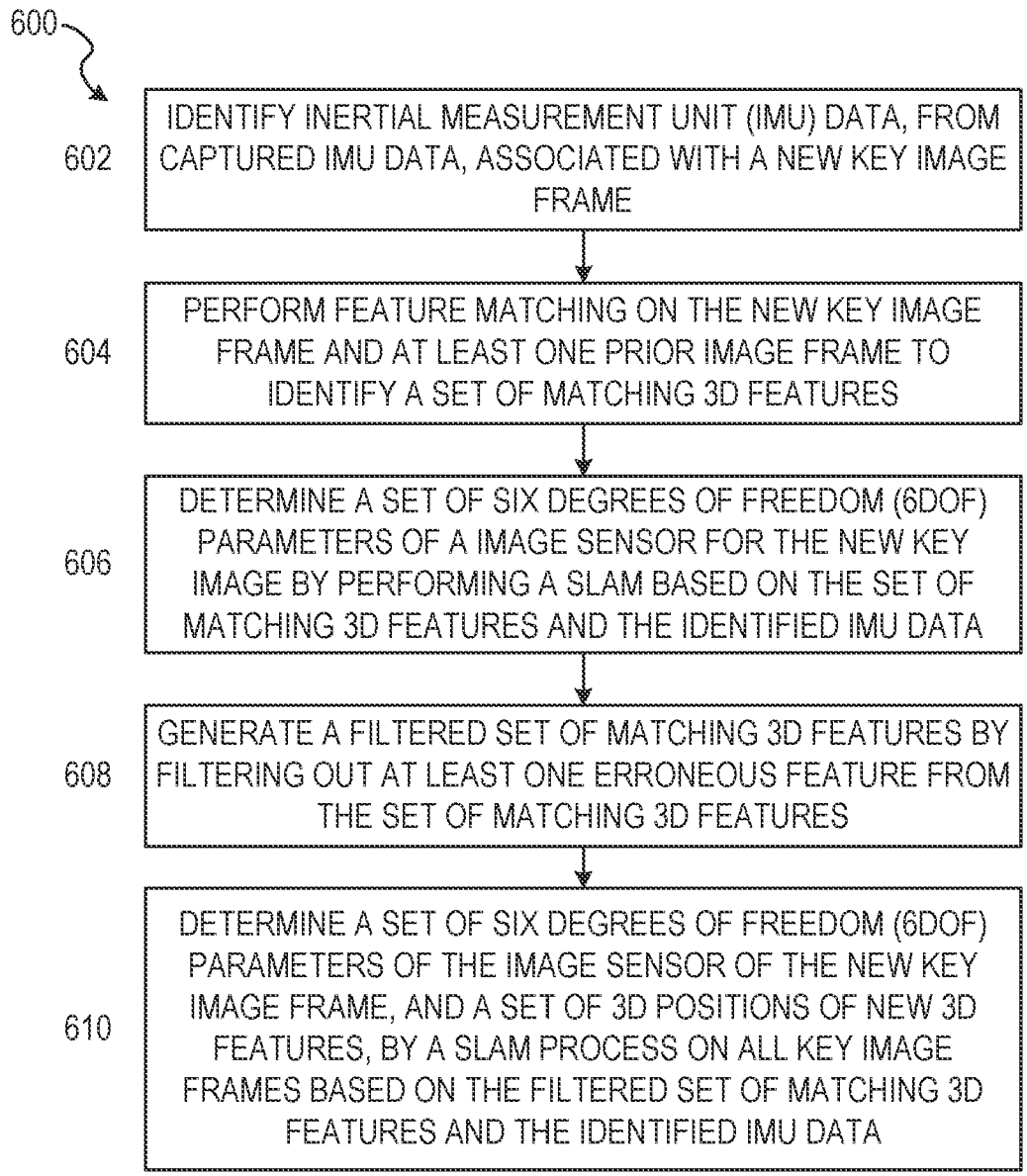

FIG. 6 is a flowchart illustrating an example method 600 for SLAM processing, according to some embodiments. In particular, the method 600 illustrates how an embodiment may perform a full SLAM process cycle. For some embodiments, the method 600 is not performed until at least two key image frames are produced by way of a SLAM initialization process (e.g., the method 500). As shown, the method 600 begins with operation 602 identifying particular IMU data, from the captured IMU data, associated with the new key image frame. The IMU data may represent IMU data captured at the time the new key image frame was captured by the image sensor.

The method 600 continues with operation 604 performing feature matching on the new key image frame and at least one prior image frame (e.g., last two captured image frames) to identify a set of matching 3D features in the physical environment. For some embodiments, operation 604 uses a feature matcher based on KAZE or A-KAZE, which extracts 3D features from a set of image frames by matching features across the image frames. The method 600 continues with operation 606 determining a first set of 6DOF parameters of the image sensor for the new key image frame by performing a (full) SLAM process on the new key image frame based on the set of matching 3D features extracted by operation 604 and the particular IMU data identified by operation 602.

The method 600 continues with operation 608 generating a filtered set of matching 3D features by filtering out at least one erroneous feature, from the set of matching 3D features extracted by operation 604, based on a set of error criteria and the first set of 6DOF parameters determined by operation 606. As described herein, the set of error criteria may include an error criterion relating to an epipolar axis, projected error, or spatial error. For instance, an error criterion may specify filtering out those features representing the top 3%/of the worst projected errors.

The method 600 continues with operation 610 determining a second set of 6DOF parameters of the image sensor for the new key image frame and a set of 3D positions of new 3D features in the physical environment by performing the (full) SLAM process on all key image frames based on the second filtered set of matching 3D features generated by operation 608 and the particular IMU data identified by operation 602.

Figure 7:
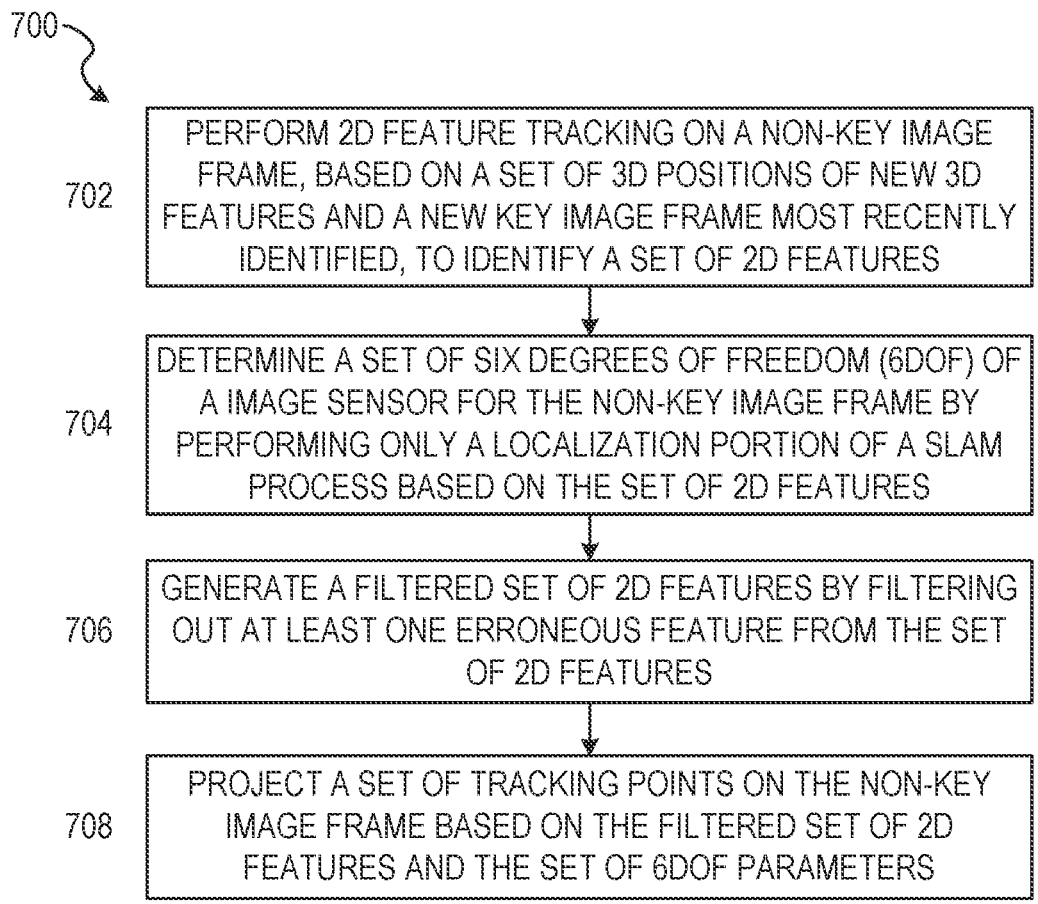

FIG. 7 is a flowchart illustrating an example method 700 for SLAM processing, according to some embodiments. In particular, the method 700 illustrates how an embodiment may perform a partial SLAM process cycle. As shown, the method 700 begins with operation 702 performing feature tracking on the non-key image frame, based on a set of 3D positions of new 3D features provided (e.g., extracted) by the last performance of a full SLAM process cycle (e.g., the method 600) and a new image frame most recently processed by the full SLAM process cycle (e.g., by the method 600). For some embodiments, operation 702 uses a 2D tracker based on the Kanade-Lucas-Tomasi (KLT) method, which extracts 2D features from the new key image frame processed by the full SLAM process cycle last performed. The method 700 continues with operation 704 determining a set of 6DOF parameters of the image sensor for the non-key image frame by performing only the localization portion of the SLAM process based on the set of 21) features from operation 702. The method 700 continues with operation 706 generating a filtered set of 2D features by filtering out at least one erroneous feature, from the set of 2D features identified by operation 702, based on a set of error criteria and the set of 6DOF parameters determined by operation 704. The set of error criteria may include, for example, an error criterion relating to an epipolar axis, projected error, or spatial error. The method 700 continues with operation 708 projecting a set of tracking points on the non-key image frame based on the filtered set of 21) features generated by operation 706 and the set of 6DOF parameters determined by operation 704. For some embodiments, the set of tracking points permits 2D virtual tracking on the non-key image frame, which may be useful in such applications as augmented reality.

Software Architecture

Figure 8:
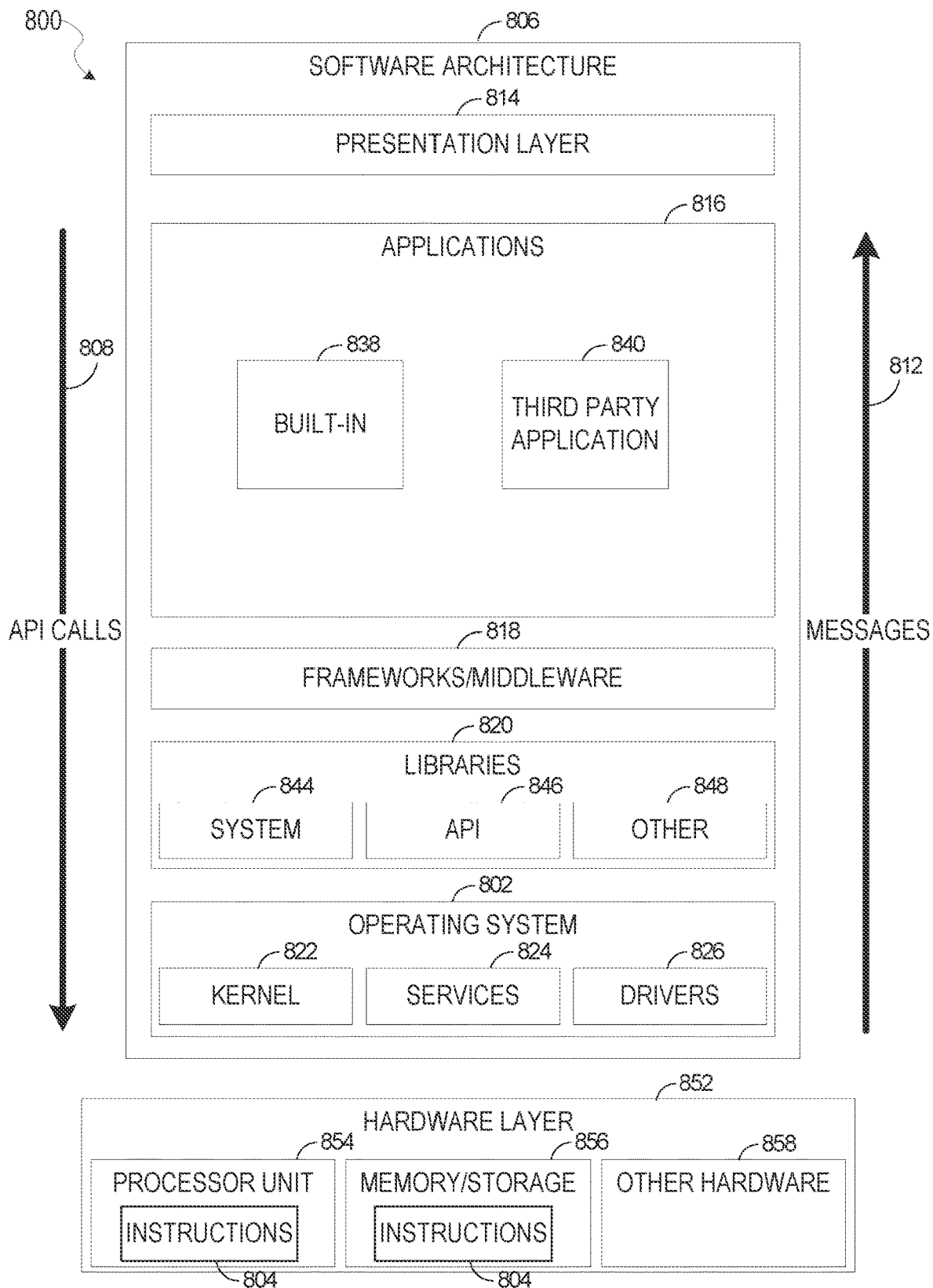
FIG. 8 is a block diagram illustrating a representative software architecture, which may be used in conjunction with various hardware architectures herein described to implement an embodiment.

FIG. 8 is a block diagram illustrating an example software architecture 806, which may be used in conjunction with various hardware architectures herein described to implement an embodiment. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processor unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response as messages 812. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824 and/or drivers 826), libraries 820, and frameworks/middleware 818 to create user interfaces to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
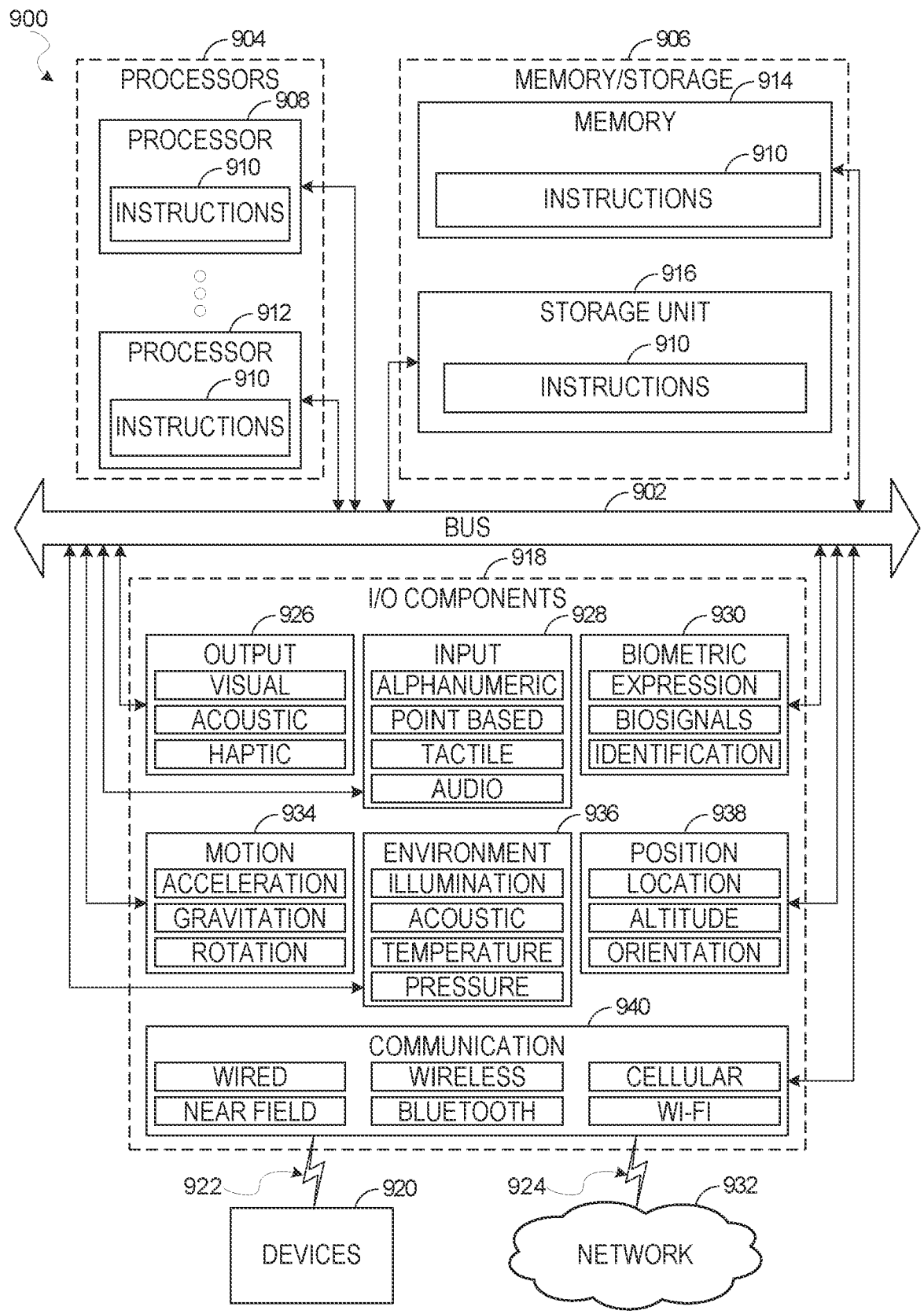
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile computing device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting a NFC beacon signal that may indicate a particular location, and so fort.

As used herein, "ephemeral message" can refer to a message that is accessible for a time-limited duration (e.g., maximum of 10 seconds). An ephemeral message may comprise a text content, image content, audio content, video content and the like. The access time for the ephemeral message may be set by the message sender or, alternatively, the access time may be a default setting or a setting specified by the recipient. Regardless of the setting technique, an ephemeral message is transitory. A message duration parameter associated with an ephemeral message may provide a value that determines the amount of time that the ephemeral message can be displayed or accessed by a receiving user of the ephemeral message. An ephemeral message may be accessed or displayed using a messaging client software application capable of receiving and displaying content of the ephemeral message, such as an ephemeral messaging application.

As also used herein, "ephemeral message story" can refer to a collection of ephemeral message content that is accessible for a time-limited duration, similar to an ephemeral message. An ephemeral message story may be sent from one user to another, and may be accessed or displayed using a messaging client software application capable of receiving and displaying the collection of ephemeral content, such as an ephemeral messaging application.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various embodiments, one or more computer systems or one or more hardware modules thereof may be configured by software (e.g., an application or portion thereof) as a hardware module that operates to perform operations described herein for that module.

In some embodiments, a hardware module may be implemented electronically. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor.

Considering embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, described hardware modules may be regarded as being communicatively coupled. Where multiple hardware modules exist contemporaneously, communications may be achieved through signal transmission (e.g., over suitable circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
identifying, by one or more hardware processors, a first key image frame from a set of captured image frames captured by an image sensor; and after detecting a movement of the image sensor from a first position, in a physical environment, to a second position in the physical environment:
identifying, by the one or more hardware processors, a second key image frame from the set of captured image frames;
performing, by the one or more hardware processors, feature matching on at least the first and second key image frames to identify a set of matching three-dimensional (3D) features in the physical environment;
generating, by the one or more hardware processors, a filtered set of matching 3D features by filtering out at least one erroneous feature, from the set of matching 3D features, based on a set of error criteria; and
determining, by the one or more hardware processors, a first set of six degrees of freedom (6DOF) parameters of the image sensor for the second key image frame and a set of 3D positions for the set of matching 3D features, the determining comprising performing a simultaneous localization and mapping (SLAM) process based on first inertial measurement unit (IMU) data associated with the first key image frame, second IMU data associated with the second key image frame, and the filtered set of matching 3D features.

2. The method of claim 1, wherein the first IMU data comprises a first set of four degrees of freedom (4DOF) parameters of the image sensor, and the second IMU data comprises a second set of 4DOF parameters of the image sensor.

3. The method of claim 1, wherein the image sensor is included in a device.

4. The method of claim 3, wherein the movement of the image sensor is caused by a human individual that is holding the device performing a sidestep.

5. The method of claim 4, wherein the identifying of the first key image frame comprises detecting a start impulse of the sidestep, and the first key image frame is a particular image frame, in the set of captured image frames, corresponding with the detected start impulse.

6. The method of claim 4, wherein the identifying of the second key image frame comprises detecting a finish impulse of the sidestep, and the second key image frame is a particular image frame, in the set of captured image frames, corresponding with the detected finish impulse.

7. The method of claim 1, further comprising:
for each particular image frame added to the set of captured image frames:
determining, by the one or more hardware processors, whether a set of key image frame conditions is satisfied for the particular image frame;
in response to the set of key image frame conditions being satisfied for the particular image frame, identifying, by the one or more hardware processors, the particular image frame as a new key image frame and performing, by the one or more hardware processors, a full SLAM process cycle on the new key image frame; and
in response to the set of key image frame conditions not being satisfied for the particular image frame, performing, by the one or more hardware processors, a partial SLAM process cycle on the particular image frame as a non-key image frame, the partial SLAM process cycle comprising only a localization portion of a SLAM process.

8. The method of claim 7, wherein the set of key image frame conditions comprises at least one of a new image frame meeting or exceeding a certain image quality, a minimum time has elapsed since the full SLAM process cycle was last performed, and a translation between a prior image frame and the new image frame meets or exceeds a minimum translation threshold.

9. The method of claim 7, wherein performing the full SLAM process cycle on the new key image frame comprises:
identifying, by the one or more hardware processors, third IMU data, from the captured IMU data, associated with the new key image frame;
performing, by the one or more hardware processors, feature matching on the new key image frame and at least one prior image frame to identify a second set of matching 3D features in the physical environment;
determining, by the one or more hardware processors, a second set of 6DOF parameters of the image sensor for the new key image frame by performing the SLAM process on the new key image frame based on the second set of matching 3D features and the third IMU data;
generating, by the one or more hardware processors, a second filtered set of matching 3D features by filtering out at least one erroneous feature, from the second set of matching 3D features, based on a second set of error criteria and the second set of 6DOF parameters; and
determining, by the one or more hardware processors, a third set of 6DOF parameters of the image sensor for the new key image frame and a set of 3D positions of new 3D features in the physical environment by performing the SLAM process on all key image frames based on the second filtered set of matching 3D features and the third IMU data.

10. The method of claim 7, wherein performing the partial SLAM process cycle on the non-key image frame comprises:
performing, by the one or more hardware processors, two-dimensional (2D) feature tracking on the non-key image frame, based on a set of 3D positions of new 3D features from the performing the full SLAM process cycle and a new key image frame most recently identified, to identify a set of 2D features;
determining, by the one or more hardware processors, a fourth set of 6DOF parameters of the image sensor for the non-key image frame by performing only the localization portion of the SLAM process based on the set of 2D features;
generating, by the one or more hardware processors, a filtered set of 2D features by filtering out at least one erroneous feature, from the set of 2D features, based on a third set of error criteria and the fourth set of 6DOF parameters; and
projecting, by the one or more hardware processors, a set of tracking points on the non-key image frame based on the filtered set of 2D features and the fourth set of 6DOF parameters.

11. A system comprising:
a memory storing instructions; and
a hardware processor communicatively coupled to the memory and configured by the instructions to perform operations comprising:
for each particular image frame, in a set of captured image frames of a physical environment captured by an image sensor:
determining, by one or more hardware processors, whether a set of key image frame conditions is satisfied for the particular image frame;
in response to the set of key image frame conditions being satisfied for the particular image frame, identifying the particular image frame as a new key image frame and performing a full simultaneous localization and mapping (SLAM) process cycle on the new key image frame; and in response to the set of key image frame conditions not being satisfied for the particular image frame, performing a partial SLAM process cycle on the particular image frame as a non-key image frame.

12. The system of claim 11, further comprising:
detecting a movement of the image sensor, from a first pose in the physical environment to a second pose in the physical environment, based on inertial measurement unit (IMU) data, the IMU data comprising degrees of freedom (DOF) parameters of the image sensor; and identifying a first key image frame and a second key image frame based on the movement, the first key image frame corresponding to a start impulse of the movement, and the second key image frame corresponding to a finish impulse of the movement.

13. The system of claim 11, wherein the set of key image frame conditions comprises at least one of a new image frame meeting or exceeding a certain image quality, a minimum time has elapsed since the full SLAM process cycle was last performed, and a translation between a prior image frame and the new image frame meets or exceeds a minimum translation threshold.

14. The system of claim 11, wherein performing the full SLAM process cycle on the new key image frame comprises:

identifying second IMU data, from captured IMU data, associated with the new key image frame, the captured IMU data being captured from an inertial measurement unit (IMU);

performing feature matching on the new key image frame and at least one prior image frame to identify a second set of matching 3D features in the physical environment;

determining a first set of six-degrees of freedom (6DOF) parameters of the image sensor for the new key image frame by performing a SLAM process on the new key image frame based on the second set of matching 3D features and the second IMU data;

generating a second filtered set of matching 3D features by filtering out at least one erroneous feature, from the second set of matching 3D features, based on a second set of error criteria and the first set of 6DOF parameters; and determining a second set of 6DOF parameters of the image sensor for the new key image frame and a set of 3D positions of new 3D features in the physical environment by performing the SLAM process on all key image frames based on the second filtered set of matching 3D features and the second IMU data.

15. The system of claim 11, wherein performing the partial SLAM process cycle on the non-key image frame comprises:

performing two-dimensional (2D) feature tracking on the non-key image frame, based on a set of 3D positions of new 3D features from the performing a full SLAM process cycle and a new key image frame most recently identified, to identify a set of 2D features;

determining a third set of six degrees of freedom (6DOF) parameters of the image sensor for the non-key image frame by performing only a localization portion of a SLAM process based on the set of 2D features;

generating a filtered set of 2D features by filtering out at least one erroneous feature, from the set of 2D features, based on a third set of error criteria and the third set of 6DOF parameters; and projecting a set of tracking points on the non-key image frame based on the filtered set of 2D features and the third set of 6DOF parameters.

16. A system comprising:
a memory storing instructions; and
a hardware processor communicatively coupled to the memory and configured by the instructions to perform operations comprising:

identifying a first key image frame from a set of captured image frames captured by an image sensor; and after detecting a movement of the image sensor from a first position, in a physical environment, to a second position in the physical environment:

identifying a second key image frame from the set of captured image frames;

performing feature matching on at least the first and second key image frames to identify a set of matching three-dimensional (3D) features in the physical environment;

generating a filtered set of matching 3D features by filtering out at least one erroneous feature, from the set of matching 3D features, based on a set of error criteria; and determining a first set of six degrees of freedom (6DOF) parameters of the image sensor for the second key image frame and a set of 3D positions for the set of matching 3D features, the determining comprising performing a simultaneous localization and mapping (SLAM) process based on first inertial measurement unit (IMU) data associated with the first key image frame, second IMU data associated with the second key image frame, and the filtered set of matching 3D features.

17. The system of claim 16, wherein the first IMU data comprises a first set of four degrees of freedom (4DOF) parameters of the image sensor, and the second IMU data comprises a second set of 4DOF parameters of the image sensor.

18. The system of claim 16, comprising:
the image sensor, wherein the movement of the image sensor is caused by a human individual that is holding the system performing a sidestep.

19. The system of claim 18, wherein the identifying of the first key image frame comprises detecting a start impulse of the sidestep, and the first key image frame is a particular image frame, in the set of captured image frames, corresponding with the detected start impulse.

20. The system of claim 18, wherein the identifying of the second key image frame comprises detecting a finish impulse of the sidestep, and the second key image frame is a particular image frame, in the set of captured image frames, corresponding with the detected finish impulse.

* * * * *